June 21, 1966 S. H. MORGAN 3,257,260
LAMINATED STRUCTURE WITH LOW DENSITY CORE
Filed Oct. 19, 1962
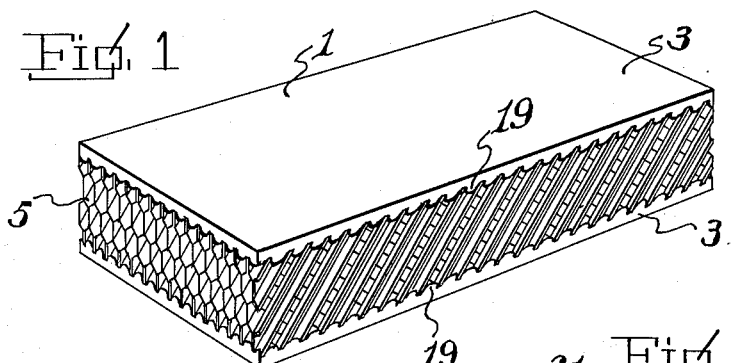
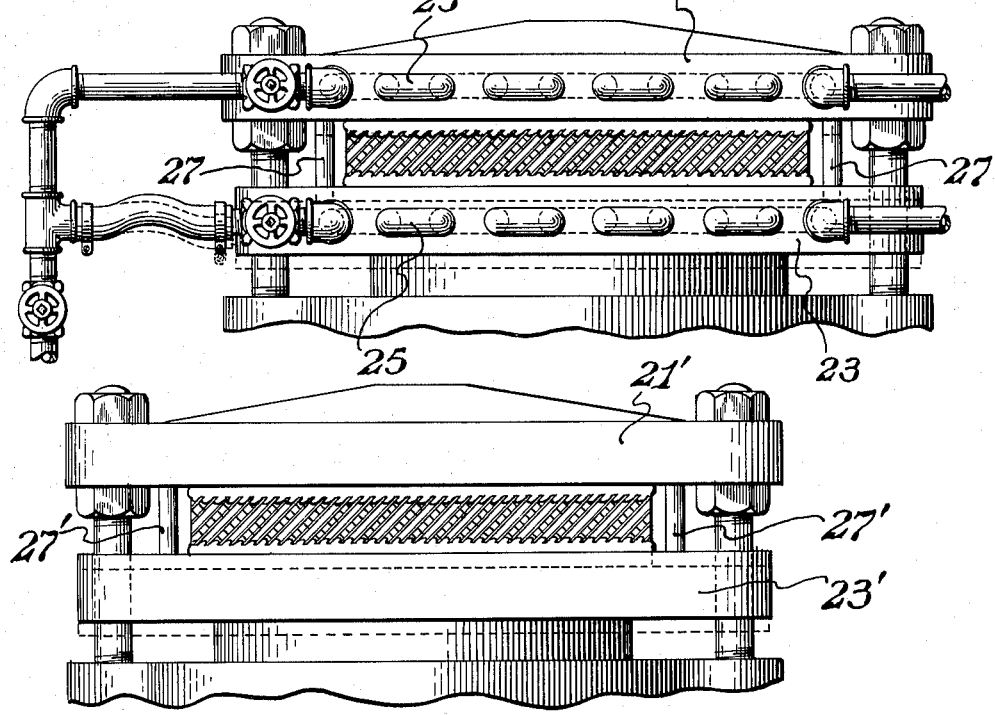
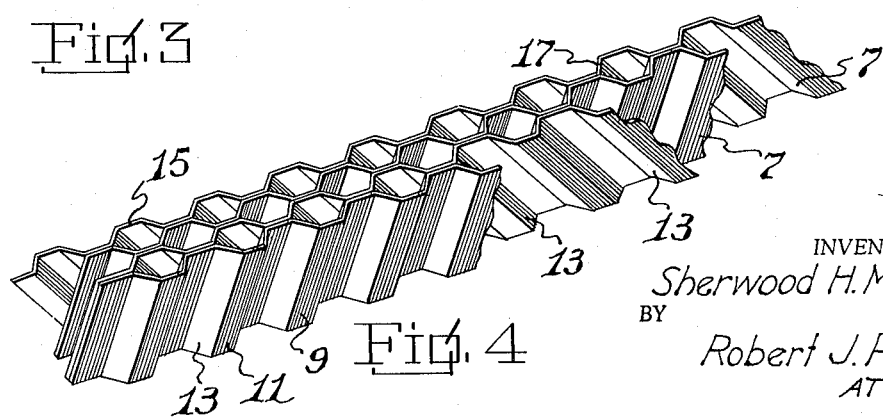
INVENTOR.
Sherwood H. Morgan
BY Robert J. Patch
ATTY.

3,257,260
LAMINATED STRUCTURE WITH LOW
DENSITY CORE
Sherwood H. Morgan, 4111 E. 41st Place, Tulsa, Okla.
Filed Oct. 19, 1962, Ser. No. 231,667
4 Claims. (Cl. 161—69)

The present invention relates to laminated structures with low density cores and methods of making the same, more particularly of the type in which a pair of skins is spaced apart by a rigid core of the multicellular type whose solid volume is only a minor proportion of its occupied volume.

This invention is addressed to the problem of securing skin to low density cores in the assembly of laminated structures, and in its more particular aspects comprises the discovery that a particular type of core structure is not only inherently quite strong but also very well adapted for the securement of skins thereto according to the techniques of the present invention.

A particularly preferred form of core structure according to the present invention is shown in Shipley et al. Patent No. 3,037,592, June 5, 1962, and the invention will be described and illustrated in connection with core structure generally similar to that of the Shipley patent. It is to be expressly understood however, that core structures other than that of Shipley may be used in the present invention.

It is also to be understood that although the preferred form of the invention comprises a pair of skins disposed one on either side of the core, the invention also includes a skin on one side only of the core.

Accordingly, it is an object of the present invention to provide a laminated structure in which the skin is bonded strongly to the core.

Another object of the present invention is the provision of methods for making laminated structures which can be quickly and easily practiced with existing machines.

Finally, it is an object of the present invention to provide laminated structures which will be relatively simple and inexpensive to manufacture and rugged and durable in use.

Other objects and advantages of the present invention will become apparent from a consideration of the following description, taken in connection with the accompanying drawing, in which:

FIGURE 1 is a fragmentary perspective view of a portion of laminate according to the present invention;

FIGURE 2 is a side elevational view of apparatus for manufacturing such laminates;

FIGURE 3 is a view similar to FIGURE 2 but showing a different embodiment of apparatus for manufacturing the laminates; and FIGURE 4 is an enlarged fragmentary perspective view of the core of the laminate according to the invention.

Briefly, the present invention comprises the discovery that greatly superior strength and much easier fabrication of laminated assemblies with low density cores can be achieved if, as a core material, there is used a core having at least one surface characterized by a plurality of oppositely inclined edge portions of sheet material with a skin bonded to that surface of the core by means of a material that is plastically deformable at the time of assembly. The exposed oppositely inclined edge portions of the core are embedded a substantial distance in the plastically deformable surface of the skin, after which the deformable material is hardened so that both sides of the skin are hardened and preferably are rigid. The oppositely inclined edge portions are thus firmly and permanently embedded in the material of the skin against withdrawal in any direction. In other words, no matter in what direction the force is applied that tends to separate the skin from the core, a number of embedded portions of the core material will be disposed at angles such as to oppose such separation. Thus, in contrast to the usual embedded structures in which edge portions of sheet material are disposed normal to the plane of the skin, the present invention provides a construction which can be broken only by breaking substantial areas of the skin material and which therefore does not depend for its strength simply on the adhesion of the skin material to the core.

In speaking of the material of the skin in this specification and the appended claims, it is quite important to understand that the skin itself may be and in many instances preferably is itself a laminate, for example of an outer layer of metal and an inner or core-bonded layer of a plastic material. For other applications, it is preferable that the skin be homogeneous throughout and of the same material on its outer side as on its core side; and in fact, it is the latter embodiment that is illustrated in the drawing.

Referring now to the drawing in greater detail, there is shown a laminated structure according to the present invention, in the form of a panel 1 comprising a pair of skins 3 one on either side of a low density core 5. Core 5 is preferably of sheet metal, the metal itself having a volume that is only a minor proportion of the total volume of the core. Core 5 is comprised of a plurality of corrugated elongated core elements 7 disposed side-by-side in parallel planes that are perpendicular to skins 3.

Each core element 7 is made up of a number of corrugations 9 that are parallel to each other but disposed at an acute angle to the planes of skins 3. That acute angle is substantially different from either 0° or 90° and in a preferred form of the invention is about 45°. Each corrugation 9 is comprised of a flat top or bottom portion 11, the various portions 11 of a given core element 7 being disposed in one or the other of the two boundary planes of the associated core element. That is to say that all the portions 11 on one side of the core element 7 are coplanar and that those on the other side of that element 7 are also coplanar in a plane parallel to that other boundary plane of that core element 7.

The uniplanar portions 11 of core element 7 are spaced apart by inclined portions 13 that extend between and are disposed at obtuse angles to their associated portions 11. Corrugations 9 terminate at both ends in end edges 15, and inclined end portions 17 of corrugations 9 are disposed adjacent and extend up to end edges 15.

The core elements 7 are so disposed that the corrugations 9 of adjoining elements 7 are oppositely inclined, as best seen in FIGURE 4. Thus, the corrugations 9 of adjoining core elements 7 cross each other with flat portions 11 in area contact with each other in the regions of the crossings. The adjoining core elements 7 are secured together in unitary assembly at these interfacial areas of portions 11, as by welding, brazing or the like.

The structure of core 5 and its method of manufacture are described in greater detail in the Shipley patent to which reference is had for further disclosure without including unnecessary detail in the present application. Suffice it to say that the core of the present invention differs from the Shipley core in that end edges 15 of the core of this application are coplanar with the rest of the portions 11 and 13 of the associated element 7, instead of being bent over as in FIGURE 5 of Shipley.

The result is a core that has a crisscross structure by virtue of the crisscrossing corrugations. The major surfaces of this core are of generally honeycombed configuration as seen in FIGURE 4, but the structure of the core adjacent these honeycomb surfaces is quite different from the ordinary honeycomb in that the inclined end portions 17 of sheet material are not normal to their associated skin 3. In fact, these inclined end portions 17 of inclined portions 13 of corrugations 9 are inclined in several different orientations, a plurality of them being spaced apart and inclined in one direction and a plurality of others being spaced apart and interspersed among that first plurality of inclined end portions and being inclined in the opposite direction.

The sides of skin 3 adjacent core 5 have surfaces 19 that are at least initially plastically deformable by virtue of being comprised of material that at least initially is pastically deformable. In its preferred forms, the material is a thermoplastic or thermosetting resin, and has a substantial depth, with end edges 15 of corrugations 9, and hence inclined end portions 17, embedded in that material to a substantial depth. Examples of thermoplastic and thermosetting resins useful with the invention are acrylic resins such as polymethylmethacrylate, amino resins such as melamine and urea resins, casein resins and glues, cellulosic resins such as cellulose acetate and cellulose acetate-butyrate, coumarone-indene resins, epoxide resins and modified epoxies, rubber such as natural or synthetic rubbers and resin-modified rubbers, phenolic resins such as phenol-formaldehyde and epoxylated phenolics, polyester resins, polyethylenes, silicones, styrene resins such as polystyrene, vinyl resins such as polyvinyl chloride, polyvinyl acetate, copolymers of various monomers, polymer blends such as acrylonitrile-butadiene-styrene, natural resins such as shellac, and many others. In addition, materials other than natural or synthetic resins may also be used so long as they are plastic or can be rendered plastic to the extent that inclined end portions 17 can be pressed into them and they will flow around such inclined end portions 17 and then preferably harden so that both surfaces of skin 3 are rigid.

As was noted above, inclined end portions 17 are embedded to a substantial depth in and below plastically deformable surfaces 19 and are held in that position against dislodgment from skin 3 by virtue of the fact that a plurality of those end portions 17 are spaced apart and are interspersed with a plurality of spaced apart oppositely inclined end edge portions, so that the core cannot slip away from the skin in any direction without carrying with it a substantial part of the initially plastically deformable surface of the skin. The strength of the laminate, therefore, is the strength of the plastically deformable material of the skin, rather than merely the frictional or adhesive grip between that material and the edges of the core material.

Laminated coatings of the invention may be fabricated in any of a number of desired ways. The preferred form of laminate is that in which a skin 3 is disposed on each of the opposite major sides of a crisscross core 5, but it is also within the invention to provide a skin 3 on one side only of the core. FIGURES 2 and 3 show various ways of constructing the laminate in which skins are disposed on opposite sides of the core. In FIGURE 2, the sandwich of the core between two skins having plastically deformable surfaces adjoining the core is assembled between a stationary upper platen 21 and a movable lower platen 23 of a press. Both platens are provided with heating coils 25 through which steam or other heating fluid is sent, and stops 27 are arranged between platens 21 and 23 to predetermine with great accuracy the thickness of the final laminate.

Lower platen 23 is then moved upwardly under pressure until stops 27 prevent further upward movement, whereby the inclined end portions of the sheet material on both sides of the core are pressed into the plastically deformable material of the core to a substantial depth at the same time that the thickness of the laminate is accurately predetermined. In the case of the embodiment of FIGURE 2, in which the platens are heated, the plastically deformable material can be a thermosetting resin which is quite viscous at the time the core material is pressed into it and that thereafter hardens to a rigid infusible matrix for the core edges upon continued application of heat through heating coils 25. Alternatively, the plastically deformable material in the embodiment of FIGURE 2 could be a thermoplastic resin that is softened by the heat in heating coils 25 to the extent that the core edges can readily penetrate to a substantial depth in the plastic material, after which a cooling fluid could be run through coils 25 to cause the initially plastic material to stiffen. Of course, the degree of final stiffness of the material can be varied depending upon whether a rigid structure of great strength is desired, in which case the plastic material should be hardened to the point that it is quite rigid, or whether a degree of resiliency and impact resistance is desired for the skins relative to the core, in which case the plastic material would be quite rigid as hardened. The apparatus of FIGURE 2 is also useful in those cases in which the material has been rendered plastically deformable by means of a solvent that is driven off by the heat of the platens.

FIGURE 3 shows an embodiment in which no special heating or cooling means are provided for the platens 21' and 23'. This embodiment is suitable for those instances in which the skin material has been rendered plastically deformable by heating prior to assembly in the laminate, or in which a "thermosetting" resin is used as the plastically deformable material, which hardens at room temperature to an infusible solid. In such cases, no auxiliary heating or cooling means is needed.

In any event, however, it is preferred that the laminate be left between the platens in the press until it is quite self-supporting to the extent that it will not change its dimensions upon removal from the press. It is also to be noted that formation of the laminate by pressing is especially convenient because the relatively thick plastic deformable material on each skin 3 makes it possible for the core to be more or less deeply embedded in the skins without interfering with accurate predetermination of the thickness of the laminate. In other words, the thick plastically deformable material of the skin provides a margin of error while nevertheless permitting the thickness of the laminate as a whole to be accurately controlled regardless of whether the thickness of the individual components of the laminate is accurately controlled. Moreover, when skins 3 are in the form of metal sheets with plastic material on their inner or core sides, then the relatively thick, plastically deformable material makes it unnecessary for the core to touch the metal skin sheet, and this construction has desirable heat insulating and electrical insulating properties.

Laminated structures according to the invention have utility in a variety of fields. Among these are use as building elements such as panels and walls, aircraft structures, machinery frames and supports, ship structures, land vehicle structures, mounting blocks for printing plates and many others.

From a consideration of the foregoing disclosure, it will be obvious that all of the initially recited objects of this invention have been achieved.

Although the present invention has been described and illustrated in connection with preferred embodiments, it is to be understood that modifications and variations may be resorted to without departing from the spirit of the invention, as those skilled in the art will readily understand. Such modifications and variations are considered to be within the purview and scope of the present invention as defined by the appended claims.

What is claimed is:

1. A laminated structure comprising at least one skin of hardened plastic material and a crisscross core disposed on one side of the skin, the core comprising a plurality of corrugated elongated metal strips disposed side by side in planes parallel to each other and substantially perpendicular to the plane of the skin, the corrugations of the strips being disposed at acute angles to the lengthwise extent of the strips and the corrugations of adjoining strips being oppositely inclined so that the corrugations of the adjoining strips cross each other, the peaks of said crossing corrugations being secured to the valleys of the corrugations of the adjoining strips, the corrugations of the strips having sharp end edge portions that are disposed in the planes of the corrugations on at least the skin side of the core, said end edge portions being disposed at acute angles to the plane of the skin and the end edge portions of the corrugations of adjoining strips being oppositely inclined, said inclined end edge portions being embedded a substantial depth in the hardened plastic material of the skin so that the material of the skin grips said oppositely inclined end edge portions to lock the skin to the core, most of the length of each corrugation being free from contact with the material of the skin.

2. A laminated structure as claimed in claim 1, there being a pair of said skins between which the core is disposed, the corrugations having oppositely inclined sharp end edge portions at both ends thereof which are disposed in the planes of the corrugations and are embedded a substantial depth in the material of both skins.

3. A laminated structure as claimed in claim 1, the material of the skin at least adjoining the core being a thermoplastic resinous material.

4. A laminated structure as claimed in claim 1, the material of the skin at least adjoining the core being a thermosetting resinous material.

References Cited by the Examiner

UNITED STATES PATENTS

| | | | |
|---|---|---|---|
| 1,953,337 | 3/1934 | Carson | 95—15 |
| 2,477,852 | 8/1949 | Bacon | 161—68 |
| 2,985,968 | 5/1961 | Koch | 35—1 |
| 3,007,834 | 11/1961 | Moeller et al. | 156—197 |
| 3,037,592 | 6/1962 | Shipley et al. | 189—34 |
| 3,072,225 | 1/1963 | Cremer et al. | 189—34 |
| 3,082,142 | 3/1963 | Payne et al. | 156—197 |
| 3,103,460 | 9/1963 | Picket | 161—69 |

EARL M. BERGERT, *Primary Examiner.*

RICHARD W. COOKE, *Examiner.*

L. R. RADANOVIC, H. F. EPSTEIN,
*Assistant Examiners.*